(12) United States Patent
Shikanai et al.

(10) Patent No.: US 9,473,189 B2
(45) Date of Patent: Oct. 18, 2016

(54) ELECTRONIC DEVICE AND METHOD OF ASSEMBLING THE SAME

(71) Applicant: Panasonic Intellectual Property Management Co., Ltd., Osaka (JP)

(72) Inventors: Masaki Shikanai, Osaka (JP); Kazunori Kouno, Osaka (JP); Junichi Hasegawa, Osaka (JP); Ryou Wakasa, Ishikawa (JP); Suguru Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/746,077

(22) Filed: Jun. 22, 2015

(65) Prior Publication Data

US 2015/0288403 A1 Oct. 8, 2015

Related U.S. Application Data

(63) Continuation of application No. PCT/JP2013/006162, filed on Oct. 17, 2013.

(30) Foreign Application Priority Data

Mar. 22, 2013 (JP) ................................. 2013-059526

(51) Int. Cl.
*H04B 1/38* (2015.01)
*G06F 1/16* (2006.01)
*H04B 1/3827* (2015.01)

(52) U.S. Cl.
CPC .............. *H04B 1/3833* (2013.01); *G06F 1/166* (2013.01); *G06F 1/1656* (2013.01); *Y10T 29/49826* (2015.01)

(58) Field of Classification Search
CPC ........ G06F 1/16; G06F 1/166; G06F 1/1601; G06F 1/1637; G06F 2200/1612; H04B 1/3833; H05K 5/02; H04M 1/0252

USPC ....................... 455/566, 575.1, 575.2, 575.3; 361/679.01, 679.58, 679.56, 741, 753; 29/1, 137, 428; 312/223.1
See application file for complete search history.

(56) References Cited

U.S. PATENT DOCUMENTS 5,941,106 A * 8/1999 Williamson, Jr. .... E05B 15/024
292/144
7,604,264 B2 * 10/2009 Lin ........................ E05B 1/0046
292/1

(Continued)

FOREIGN PATENT DOCUMENTS

JP 2000-207055 A 7/2000
JP 2000-222062 A 8/2000

(Continued)

OTHER PUBLICATIONS

International Search Report issued in PCT/JP2013/006162, dated Jan. 7, 2014, with English translation.

*Primary Examiner* — Khawar Iqbal
(74) *Attorney, Agent, or Firm* — McDermott Will & Emery LLP

(57) ABSTRACT

An electronic device includes a housing, frame, and a lock attachment mechanism. The housing includes a front cabinet, and back cabinet which has opening and is attached to the front cabinet. The frame is disposed in the inside of the housing. The lock attachment mechanism includes lock attachment portion and hook portion. The lock attachment portion includes a pull-out portion with a hole disposed therein, and a leg portion protruding from the pull-out portion. The hook portion includes fixing portions attached to frame, and grappling portions that hook the leg portion with the pull-out portion being pulled out, and that form a gap through which the pull-out portion can be pulled out. The device further includes back cabinet having a holder. The holder restricts a movable range of lock attachment portion and holds the leg portion such that lock attachment portion is disposed at a location which allows the pull-out portion to be pulled out through opening.

3 Claims, 8 Drawing Sheets

(56) References Cited

U.S. PATENT DOCUMENTS

| | | | | |
|---|---|---|---|---|
| 8,094,439 | B2* | 1/2012 | Lin | H01M 2/1066 361/679.01 |
| 8,102,645 | B2* | 1/2012 | Zhang | H01H 9/00 361/679.01 |
| 8,107,236 | B2* | 1/2012 | Lin | E05B 73/0082 248/551 |
| 8,223,490 | B2* | 7/2012 | Dong | E05C 3/162 361/679.01 |
| 8,248,812 | B2* | 8/2012 | Xiong | H01M 2/1061 361/726 |
| 8,300,408 | B2* | 10/2012 | Tatsukami | G06F 1/1616 361/679.09 |
| 8,345,422 | B2* | 1/2013 | Chen | H01M 2/1022 361/679.58 |
| 8,610,402 | B2* | 12/2013 | Giribet Guadamillas | H01R 13/6315 320/114 |
| 9,400,528 | B2* | 7/2016 | Montevirgen | G06F 1/1656 |
| 2006/0166083 | A1* | 7/2006 | Zhang | H01M 2/1066 429/97 |
| 2006/0172183 | A1* | 8/2006 | Chen | H01M 2/1066 429/97 |
| 2006/0175840 | A1* | 8/2006 | Wang | H04M 1/0262 292/228 |
| 2006/0292439 | A1* | 12/2006 | Zuo | H04M 1/0262 429/97 |
| 2007/0026297 | A1* | 2/2007 | Qin | H01M 2/1066 429/97 |
| 2007/0087263 | A1* | 4/2007 | Ge | H01M 2/1066 429/97 |
| 2010/0141853 | A1 | 6/2010 | Yuyama et al. | |
| 2010/0177468 | A1* | 7/2010 | Liu | H01M 2/1066 361/679.01 |
| 2010/0320884 | A1 | 12/2010 | Shiroishi et al. | |
| 2012/0307425 | A1* | 12/2012 | Lo | H04M 1/0262 361/679.01 |
| 2013/0033802 | A1* | 2/2013 | Li | H04M 1/23 361/679.01 |
| 2013/0160244 | A1* | 6/2013 | Sayama | E05D 3/18 16/370 |
| 2013/0279124 | A1* | 10/2013 | Guo | H01M 2/1066 361/747 |
| 2014/0160646 | A1* | 6/2014 | Lu | H05K 5/03 361/679.01 |
| 2014/0233167 | A1* | 8/2014 | Rayner | G06F 1/1656 361/679.3 |
| 2014/0274229 | A1* | 9/2014 | Fukuda | H04M 1/03 455/575.1 |

FOREIGN PATENT DOCUMENTS

| | | |
|---|---|---|
| JP | 2010-134174 A | 6/2010 |
| JP | 2011-002935 A | 1/2011 |

\* cited by examiner

ELECTRONIC DEVICE AND METHOD OF ASSEMBLING THE SAME

RELATED APPLICATIONS

This application is a continuation of International Application No. PCT/JP2013/006162, filed on Oct. 17, 2013, which in turn claims the benefit of Japanese Application No. 2013-059526, filed on Mar. 22, 2013, the disclosures of which Applications are incorporated by reference herein.

TECHNICAL FIELD

The present disclosure relates to electronic devices and methods of assembling the devices.

BACKGROUND ART

Unexamined Japanese Patent Publication No. 2000-207055 discloses a computer. The computer is equipped with a plate having a lock hole through which an anti-theft dedicated lock is attached. The computer is capable of accommodating the plate in the inside or along the back side of the computer.

This configuration allows the computer to allocate the smallest minimum area, in a housing of the body thereof, which is exclusively occupied by the lock hole, thereby preventing its appearance from being spoiled.

SUMMARY

An electronic device according to the present disclosure includes a housing, a frame, and a lock attachment mechanism. The housing includes a front cabinet, and a back cabinet which has an opening and is attached to the front cabinet. The frame is disposed in the inside of the housing. The lock attachment mechanism includes a lock attachment portion and a hook portion. The lock attachment portion includes a pull-out portion with a hole being disposed therein, and a leg portion protruding from the pull-out portion. The hook portion includes fixing portions attached to the frame, and grappling portions that hook the leg portion with the pull-out portion being pulled out, and that form a gap through which the pull-out portion can be pulled out. The back cabinet includes a holder. The holder restricts a movable range of the lock attachment portion, and holds the leg portion such that the lock attachment portion is disposed at a location which allows the pull-out portion to be pulled out through the opening.

Moreover, a method of assembling the electronic device according to the present disclosure includes a step of preparing a back body. The back body includes: the back cabinet with the opening being disposed therein, the lock attachment portion which has the pull-out portion and the leg portion protruding from the pull-out portion, and the holder. The holder restricts the movable range of the lock attachment portion, and holds the leg portion such that the pull-out portion is disposed at a location where the pull-out portion can be pulled out through the opening. Furthermore, the method includes a step of preparing a front body. The front body includes the front cabinet, the frame attached to the front cabinet, and the hook portion. The hook portion has the fixing portions attached to the frame and has the grappling portions that form the gap through which the pull-out portion can be pulled out and that hook the leg portion with the pull-out portion being pulled out. Then, the method includes a step of assembling the back body to the front body.

This configuration allows the electronic device in which the lock attachment portion can be pulled out, and the back cabinet has no cut-away portion.

DESCRIPTION OF EMBODIMENTS

Hereinafter, embodiments will be described in detail, with appropriate reference to the accompanying drawings. It is noted, however, that descriptions in more detail than necessary will sometimes be omitted. For example, detailed descriptions of well-known items and duplicate descriptions of substantially the same configuration will sometimes be omitted, for the sake of brevity of the following descriptions and easy understanding by those skilled in the art.

Note that the accompanying drawings and the following descriptions of the embodiments are provided herein to facilitate fully understanding of the present disclosure by those skilled in the art, and are in no way intended to impose any limitation on the subject matter set forth in the appended claims.

First Exemplary Embodiment

Hereinafter, a first embodiment will be described with reference to FIGS. 1 to 8C.

1. Configuration of Tablet Terminal 100

Figure 1:
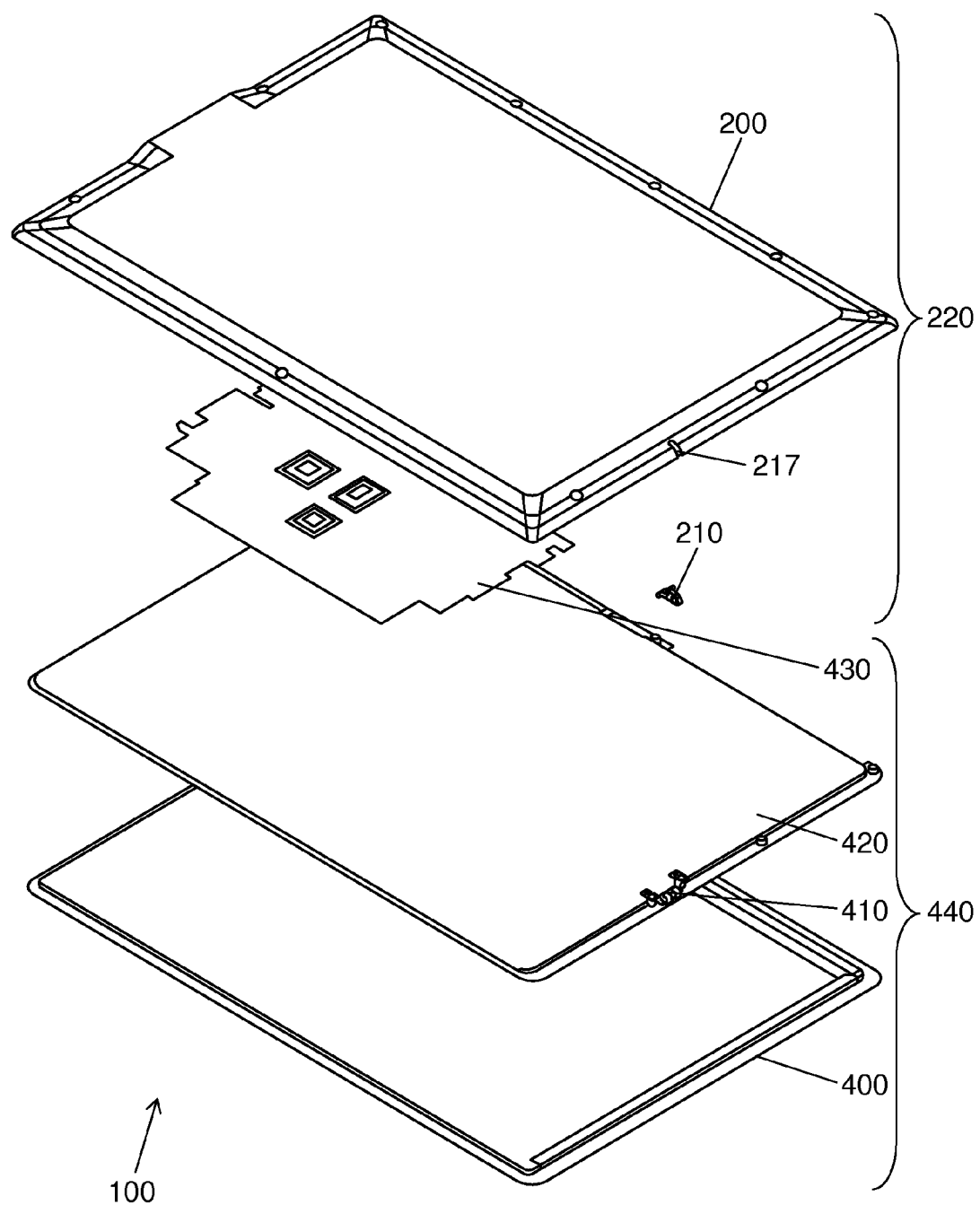
FIG. 1 is an exploded perspective view of tablet terminal 100.

A configuration of tablet terminal 100 is described using FIG. 1. FIG. 1 is an exploded perspective view of tablet terminal 100.

Tablet terminal 100 includes back body 220 and front body 440. Back body 220 includes back cabinet 200 and lock attachment portion 210. Back cabinet 200 is one which configures a housing when the cabinet is assembled to display panel 400. Back cabinet 200 is formed of a resin or the like. In back cabinet 200, opening 217 is formed. Lock attachment portion 210 is a metal part for attaching an anti-theft lock thereto. For example, lock attachment portion 210 is formed of a zinc alloy. Lock attachment portion 210 is held by back cabinet 200 at a location which renders the lock attachment portion capable of being pulled out through opening 217.

Front body 440 includes display panel 400, frame 420, board 430, and hook portion 410. Display panel 400 is a front cabinet which includes a panel to display images. Frame 420 is a metal frame disposed on display panel 400. For example, frame 420 is formed of a magnesium alloy. Board 430 is a board on which electronic components such as a CPU (Central Processing Unit) are mounted. Board 430 is disposed on frame 420. Hook portion 410 is a metal part to hook lock attachment portion 210. For example, hook portion 410 is formed of stainless steel.

Hook portion 410 is fixed to frame 420.

2. Configuration of the Lock Attachment Portion

Figure 2:
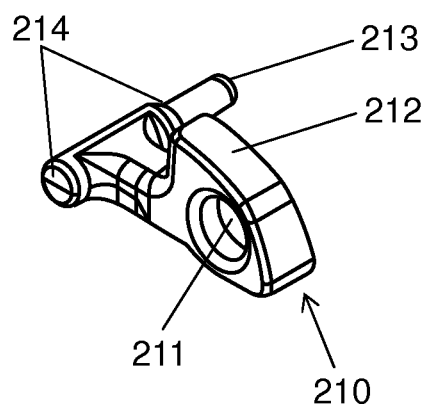
FIG. 2 is a perspective view of lock attachment portion 210.
Figure 3:
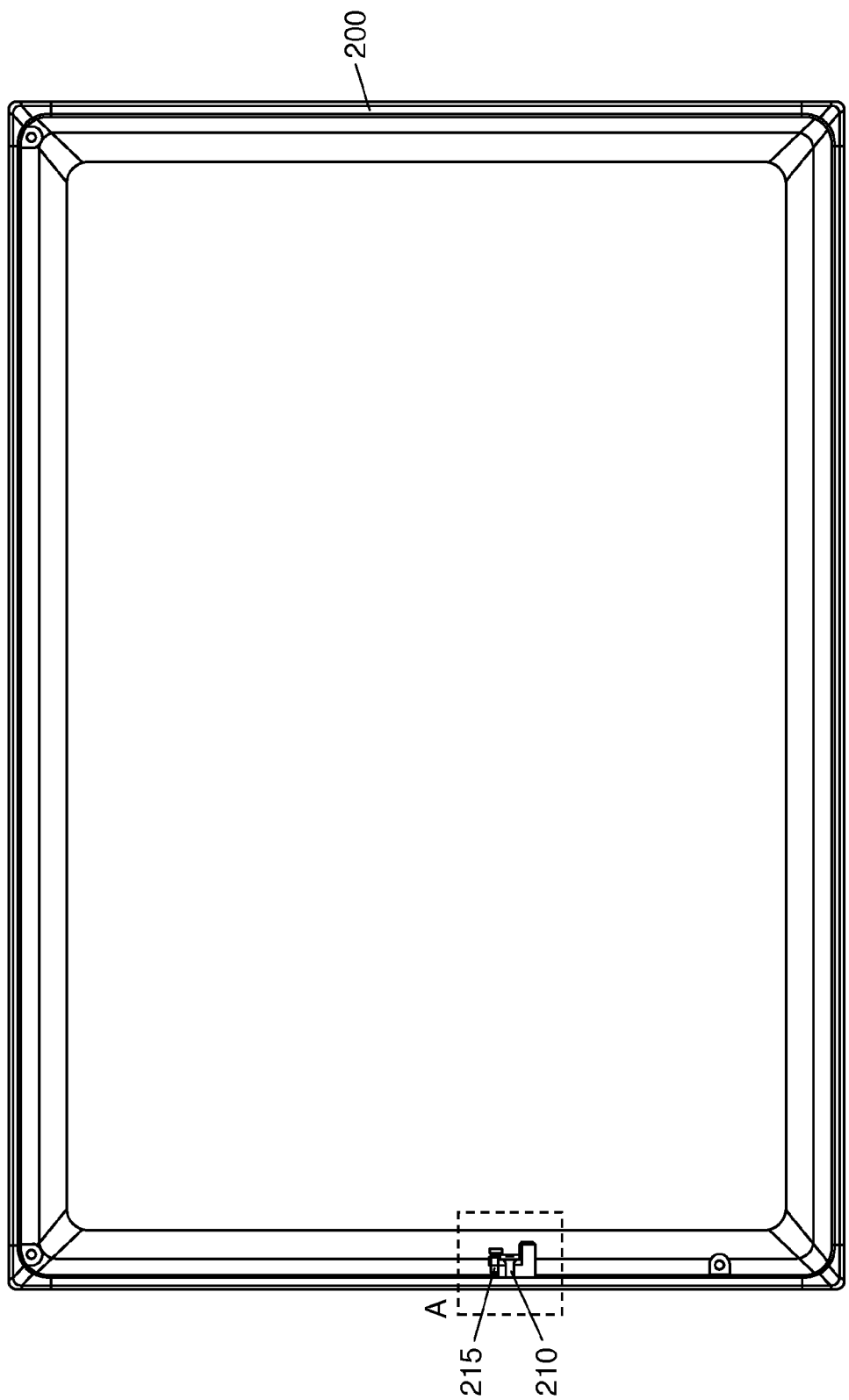
FIG. 3 is a plan view of back cabinet 200 with lock attachment portion 210 being held thereby.
Figure 4:
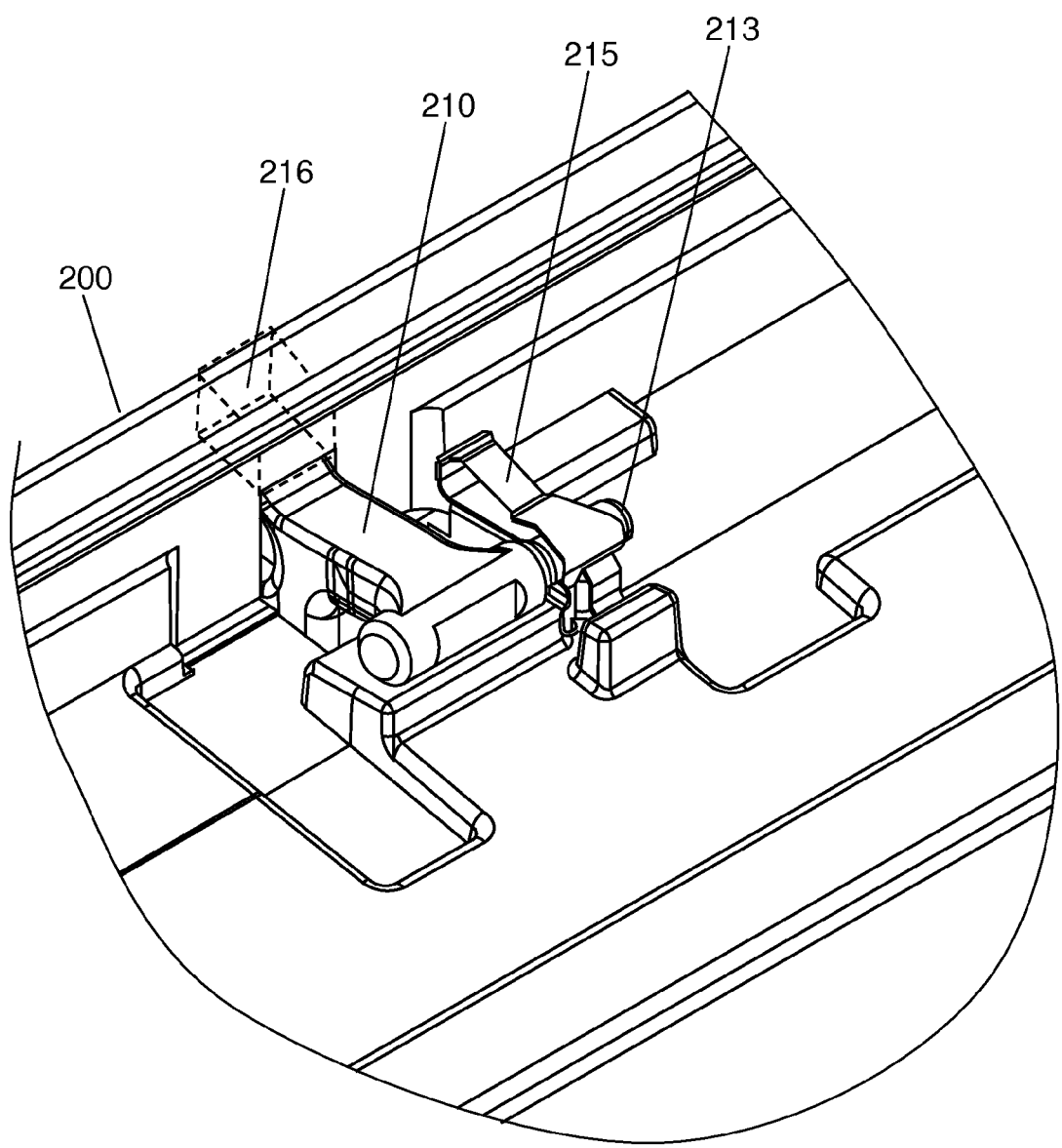
FIG. 4 is a perspective view illustrating a state of lock attachment portion 210 being held by back cabinet 200.

A configuration of lock attachment portion 210 is described using FIGS. 2 to 4. FIG. 2 is a perspective view of lock attachment portion 210. FIG. 3 is a plan view of back cabinet 200, viewed from below. FIG. 4 is an enlarged perspective view of a portion around lock attachment portion 210, with the portion corresponding to region A of FIG. 3.

As shown in FIG. 2, lock attachment portion 210 includes pull-out portion 212 in which hole 211 is formed, leg portion 214, and leg portion 213formed in leg portion 214. Pull-out portion 212 is a part which is pulled out through opening 217 of back cabinet 200. Hole 211 formed in pull-out portion 212 is a hole through which the anti-theft lock is passed. Leg portion 214 is a leg to be hooked on hook portion 410. Leg portion 213 is a leg to be held by back cabinet 200.

As shown in FIGS. 3 and 4, leg portion 213 of lock attachment portion 210 is held by plate spring 215. Plate spring 215 is formed such that the width of the spring is wide at the both ends of the spring, and becomes narrower at closer positions to the center of the spring. In the state shown in FIG. 4, pull-out portion 212 of lock attachment portion 210 is accommodated in the inside of back cabinet 200. When leg portion 213 of lock attachment portion 210 is moved to a position beyond the center portion of plate spring 215, pull-out portion 212 of lock attachment portion 210 is pulled out to the outside of back cabinet 200. Plate spring 215 restricts the movable range of lock attachment portion 210. A user, who pulls out pull-out portion 212 of lock attachment portion 210, can experience click feeling at a moment when leg portion 213 of lock attachment portion 210 passes the center portion of plate spring 215.

3. Configuration of the Hook Portion

Figure 5:
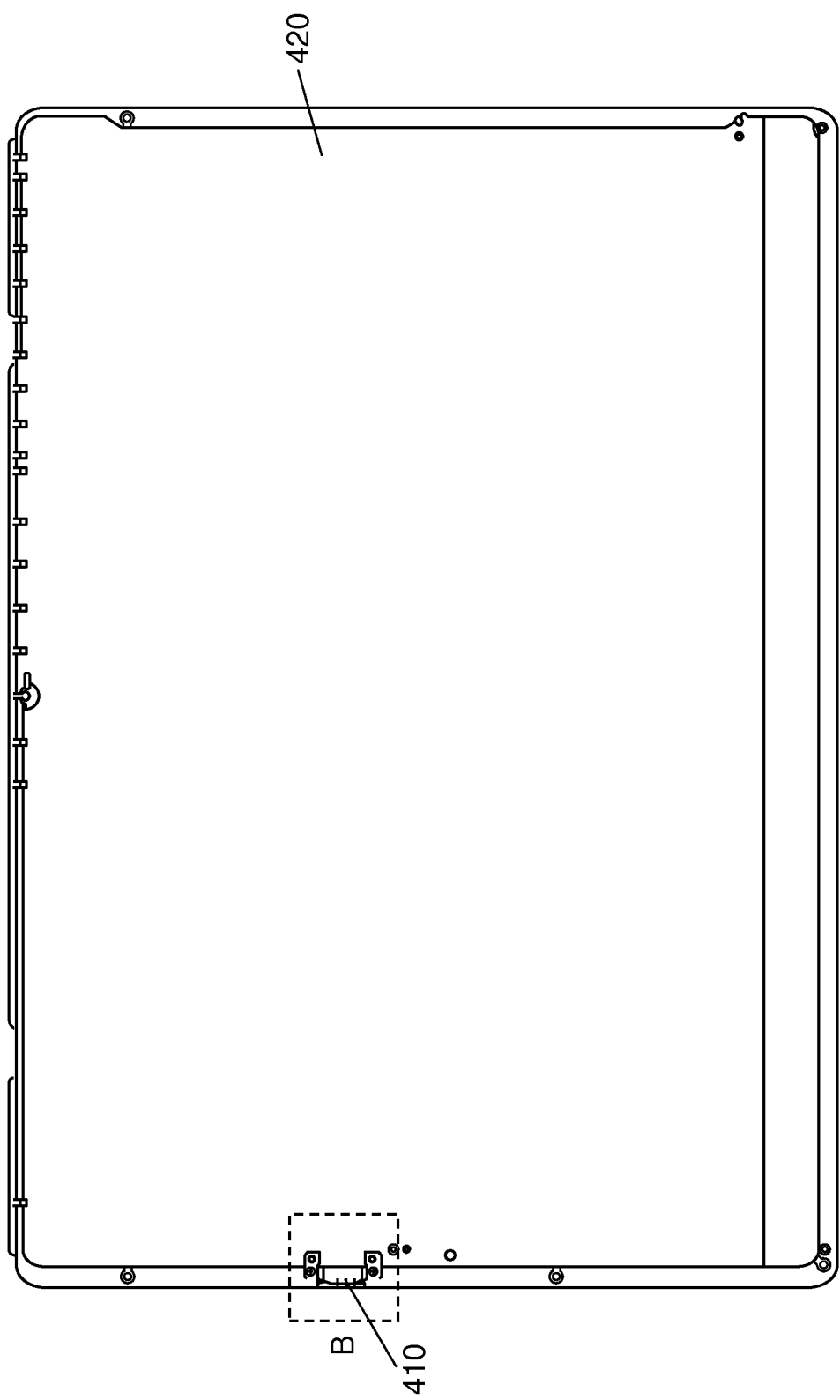
FIG. 5 is a plan view of display panel 400 including frame 420 to which hook portion 410 is fixed.
Figure 6:
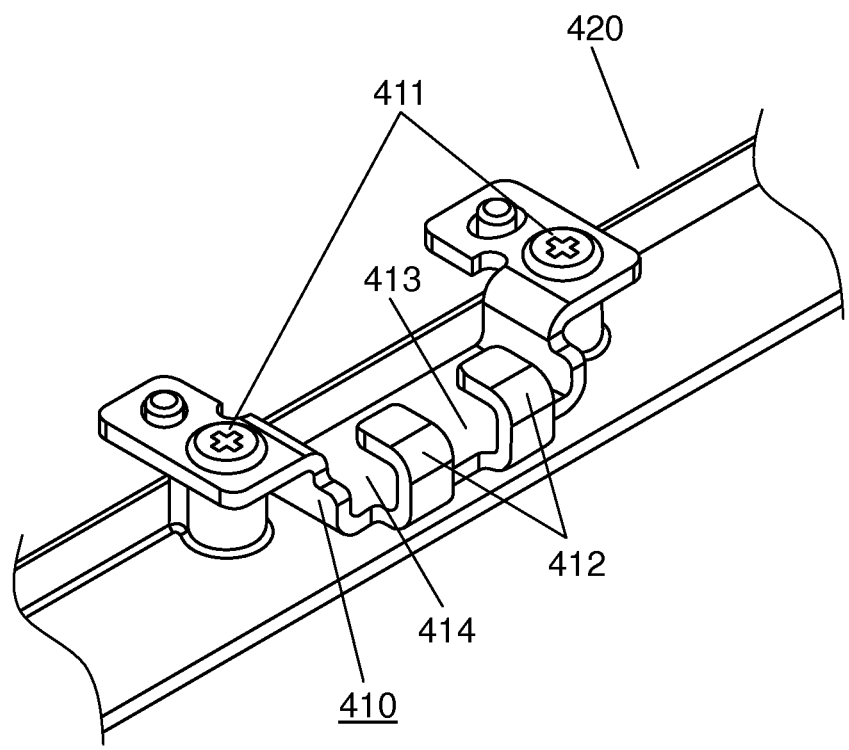
FIG. 6 is a perspective view of hook portion 410.

A configuration of hook portion 410 is described using FIGS. 5 and 6. FIG. 5 is a plan view of frame 420, viewed from above. FIG. 6 is an enlarged perspective view of a portion including hook portion 410, with the portion corresponding to region B of FIG. 5.

As shown in FIGS. 5 and 6, hook portion 410 includes fixing portions 411, sliding surface 414, and grappling portions 412. Fixing portions 411 are screw holes. Screws are tightened into fixing portions 411 to fix hook portion 410 to frame 420. Sliding surface 414 is a surface on which lock attachment portion 210 slides. Each of grappling portions 412 is a claw to hook leg portion 214 of lock attachment portion 210. Grappling portion 412 is formed such that it warps back relative to sliding surface 414. In hook portion 410, two grappling portions 412 form gap 413 therebetween. Gap 413 is a gap through which pull-out portion 212 of lock attachment portion 210 is pulled out.

4. Method of Assembling the Tablet Terminal

Figure 7A:
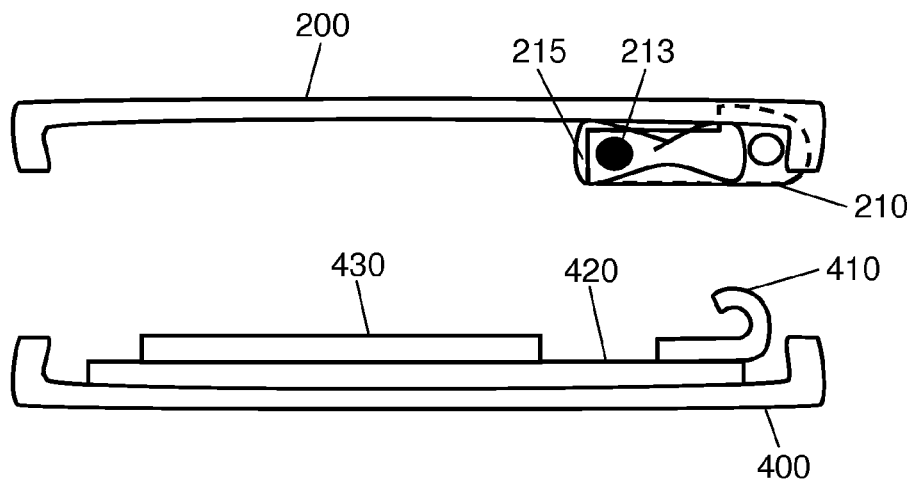
FIG. 7A is a schematic view illustrating a method of assembling tablet terminal 100.
Figure 7B:
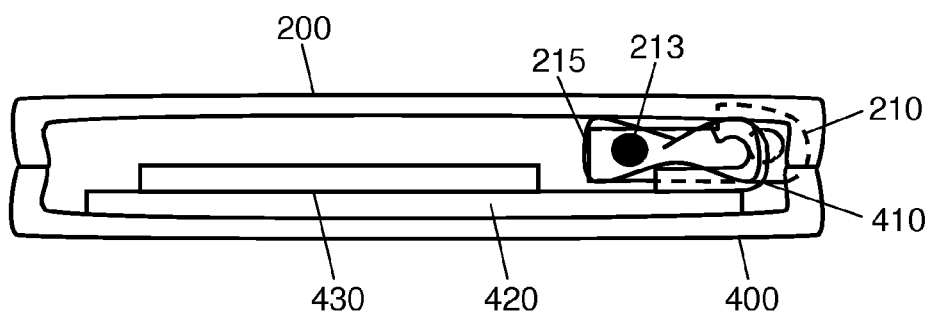
FIG. 7B is another schematic view illustrating the method of assembling tablet terminal 100.
Figure 7C:
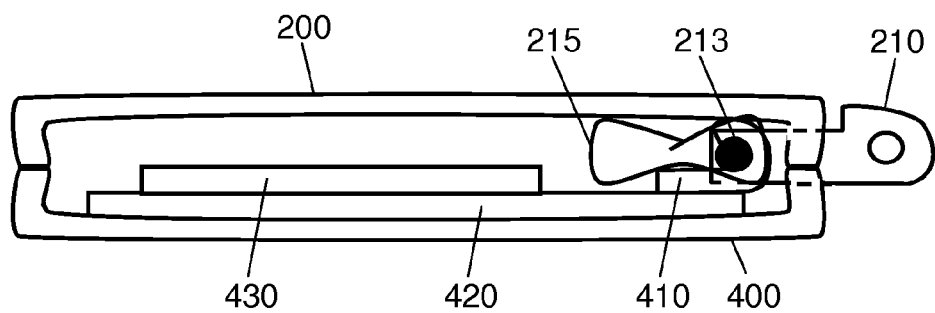
FIG. 7C is yet another schematic view illustrating the method of assembling tablet terminal 100.

A method of assembling tablet terminal 100 is described using FIGS. 7A to 7C. FIGS. 7A to 7C are schematic views illustrating the method of assembling tablet terminal 100.

First, an assemble operator prepares frame 420 with hook portion 410 being fixed thereto, display panel 400 with board 430 being disposed thereto, and back cabinet 200 with leg portion 213 of lock attachment portion 210 being held thereto by plate spring 215. As shown in FIG. 7A, the assemble operator places thus-prepared back cabinet 200 and display panel 400 to face each other. Then, as shown in FIG. 7B, the assemble operator assembles back cabinet 200 to display panel 400, with the both facing each other. The assembling of back cabinet 200 to display panel 400 with the both facing each other, allows lock attachment portion 210 to be pulled out from back cabinet 200, as shown in FIG. 7C. In the course where the state shown in FIG. 7B is changed to that shown in FIG. 7C, leg portion 213 of lock attachment portion 210 passes the center portion of plate spring 215. When the state is changed to that shown in FIG. 7C, leg portion 213 of lock attachment portion 210 is hooked on hook portion 410.

5. Operations of the Lock Attachment Portion

Figure 8A:
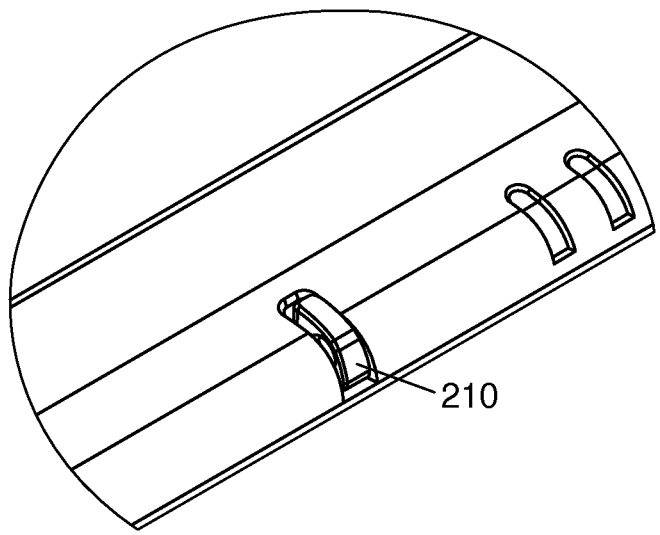
FIG. 8A is a perspective view illustrating a possible state of lock attachment portion 210.
Figure 8B:
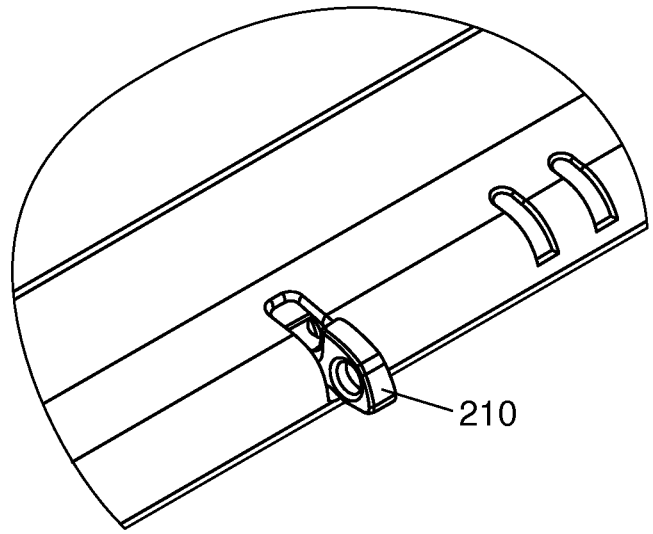
FIG. 8B is a perspective view illustrating another possible state of lock attachment portion 210.
Figure 8C:
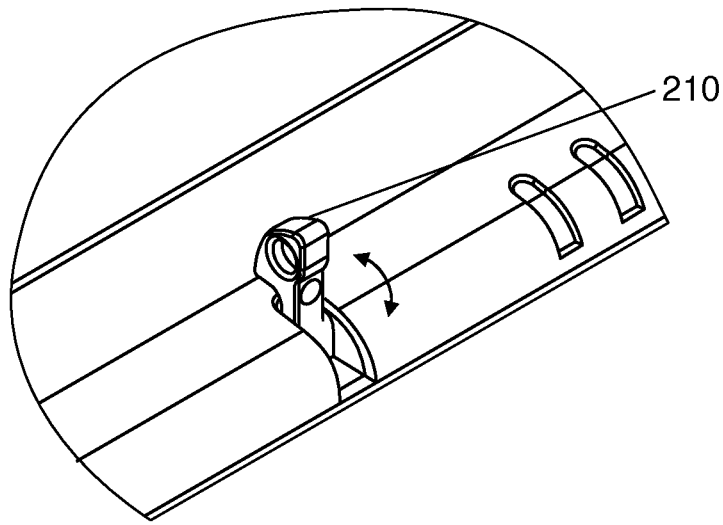
FIG. 8C is a perspective view illustrating yet another possible state of lock attachment portion 210.

Operations of lock attachment portion 210 in the state where tablet terminal 100 has been assembled is described using FIGS. 8A to 8C. FIGS. 8A to 8C are perspective views illustrating the operations of lock attachment portion 210.

As shown in FIG. 8A, lock attachment portion 210 is capable of being accommodated in the inside of tablet terminal 100. Starting with the state shown in FIG. 8A, lock attachment portion 210 is pulled out to change the state into that shown in FIG. 8B. The state shown in FIG. 8B corresponds to the state shown in FIG. 7C. Starting with the state shown in FIG. 8B, lock attachment portion 210 is lifted in a rotary direction to cause leg portion 214 to slide on sliding surface 414, which changes the state into that shown in FIG. 8C. That is, lock attachment portion 210 is rotatably held in the inside of tablet terminal 100, with leg portion 214 being as the rotation axis. This is because leg portion 214 of lock attachment portion 210 is hooked on such round-shaped grappling portions 412.

6. Advantages and Others

In this way, tablet terminal 100 according to the present disclosure is equipped with the housing, frame 420, and the lock attachment mechanism. The housing includes display panel 400, and back cabinet 200 that is attached to display panel 400 and that has opening 217. Frame 420 is disposed in the inside of the housing. The lock attachment mechanism includes lock attachment portion 210 and hook portion 410. Lock attachment portion 210 includes pull-out portion 212 with hole 211 being disposed therein, and leg portion 214 that protrudes form pull-out portion 212. Hook portion 410 includes grappling portions 412 and fixing portions 411 attached to frame 420. Grappling portions 412, which form gap 413 through which pull-out portion 212 can be pulled out, hook leg portion 214 thereon with pull-out portion 212 being pulled out. Back cabinet 200 includes plate spring 215 that restricts the movable range of lock attachment portion 210. Plate spring 215 holds leg portion 213 such that lock attachment portion 210 is disposed at a location which allows pull-out portion 212 to be pulled out through opening 217.

With this configuration, tablet terminal 100 according to the present disclosure is capable of accommodating the lock attachment mechanism in the inside of tablet terminal 100, without the need for cutting away an area such as region 216 of FIG. 4. Here, assume a case where lock attachment portion 210 is not held on the back cabinet 200 side, but is disposed in advance on hook portion 410 on the display panel 400 side. In this case, unless the area such as region 216 of FIG. 4 is cut away, back cabinet 200 cannot be assembled to display panel 400. This is because the end portion of back cabinet 200 is inevitably hooked on lock attachment portion 210 that is disposed on hook portion 410 in advance.

Moreover, in tablet terminal 100 according to the present disclosure, frame 420 is formed of a metal. Hook portion 410 is fixed not to back cabinet 200 formed of a resin or the like, but to frame 420 formed of the metal.

In this way, when back cabinet 200 is formed of a material such as the resin which is lower in strength than metal, this allows tablet terminal 100 according to the present disclosure to increase the strength of the lock attachment mechanism, in comparison to the case where hook portion 410 is fixed to back cabinet 200.

Furthermore, the method of assembling tablet terminal 100 according to the present disclosure includes the step of preparing back body 220 that includes back cabinet 200, lock attachment portion 210, and plate spring 215. Back cabinet 200 includes opening 217 disposed therein. Lock attachment portion 210 includes pull-out portion 212 with hole 211 being disposed therein, and leg portion 214 protruding from pull-out portion 212. Plate spring 215 restricts the movable range of lock attachment portion 210, and holds leg portion 213 such that pull-out portion 212 is disposed at a location where pull-out portion 212 can be pulled out through opening 217. In addition, the method includes the step of preparing front body 440 that includes display panel 400, frame 420 attached to display panel 400, and hook portion 410. Hook portion 410 includes fixing portions 411 attached to frame 420, and grappling portions 412. Grappling portions 412, which form gap 413 through which pull-out portion 212 can be pulled out, hook leg portion 214 thereon with pull-out portion 212 being pulled out. Then, the method includes the step of assembling back body 220 to front body 440. With this configuration, the method of assembling tablet terminal 100 according to the present disclosure allows the assembling of tablet terminal 100 without the need for cutting the area such as region 216 of FIG. 4.

Other Exemplary Embodiments

As described above, the first embodiment has been described as an example of the technology disclosed herein. It is noted, however, that the technology according to the present disclosure is not limited to the first embodiment, and is also applicable to other embodiments that are subjected, as appropriate, to various changes and modifications, replacements, additions, omissions, and the like.

Then, other embodiments will be described as examples, hereinafter.

In the first embodiment, each of grappling portions 412 of hook portion 410 has a round shape. However, the configuration of the hook portion is not necessarily limited to such a shape. The grappling portion of the hook portion may have a near-round or square-cornered shape. In short, the grappling portion of the hook portion is required only to have a shape with which the leg portion is hooked on the grappling portion with the pull-out portion being pulled out.

Moreover, in the first embodiment, hook portion 410 includes two grappling portions 412. However, the configuration of the hook portion is not necessarily limited to this. For example, the hook portion may be configured with one grappling portion. In this case, the pull-out portion may be configured to be capable of being pulled out through a gap between the one grappling portion and a side wall of the hook portion, and the lock attachment portion may be configured to have one leg portion.

Furthermore, in the first embodiment, leg portion 213 of lock attachment portion 210 is held by plate spring 215. However, the configuration is not necessarily limited to this. For example, a plate spring may be configured to hold leg portion 214 of lock attachment portion 210. In addition, the holding of lock attachment portion 210 is not necessarily made with a plate spring such as plate spring 215, but may be made with a part which is only for pinching lock attachment portion 210.

In addition, in the first embodiment, hook portion 410 is a separate part from frame 420. However, the configuration is not necessarily limited to this. For example, the hook portion and the frame may be integrally formed as a one-body part.

Moreover, in the first embodiment, the front cabinet is exemplified by display panel 400, as an example. However, the configuration is not necessarily limited to this. For example, the front cabinet may be a cover or the like which has no display panel.

As described above, the embodiments have been described as examples of the technology according to the present disclosure. To that end, the accompanying drawings and the detailed descriptions have been presented.

Therefore, the constituent elements described in the accompanying drawings and the detailed descriptions may include not only essential elements for solving the problems, but also inessential ones for solving the problems which are described only for the exemplification of the technology described above. For this reason, it should not be acknowledged that these inessential elements are considered to be essential only on the grounds that these inessential elements are described in the accompanying drawings and/or the detailed descriptions.

Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents.

The technology according to the present disclosure is applicable to electronic devices such as tablet terminals and personal computers, and is applicable to methods of assembling the electronic devices such as tablet terminals and personal computers.

The invention claimed is:

1. An electronic device comprising:
   a housing including:
      a front cabinet; and
      a back cabinet having an opening and attached to the front cabinet;
   a frame disposed in an inside of the housing; and
   a lock attachment mechanism including:
      a lock attachment portion having:
         a pull-out portion having a hole; and
         a leg portion protruding from the pull-out portion; and
      a hook portion having:
         a fixing portion attached to the frame; and
         a grappling portion forming a gap through which the pull-out portion is pulled out, and hooking the leg portion with the pull-out portion being pulled out,
   wherein the back cabinet includes a holder restricting a movable range of the lock attachment portion, the holder holding the leg portion such that the lock attachment portion is disposed at a location allowing the pull-out portion to be pulled out through the opening.

2. The electronic device according to claim 1, wherein the frame is formed of metal.

3. A method of assembling an electronic device, the method comprising the steps of:
  preparing a back body including:
    a back cabinet having an opening;
    a lock attachment portion having:
      a pull-out portion having a hole; and
      a leg portion protruding from the pull-out portion; and
    a holder restricting a movable range of the lock attachment portion, and holding the leg portion such that the pull-out portion is disposed at a location where the pull-out portion can be pulled out through the opening;
  preparing a front body including:
    a front cabinet;
    a frame attached to the front cabinet; and
    a hook portion having:
      a fixing portion attached to the frame; and
      a grappling portion forming a gap through which the pull-out portion is pulled out, and hooking the leg portion with the pull-out portion being pulled out; and
  assembling the back body to the front body.

\* \* \* \* \*